United States Patent [19]

Glaeser

[11] Patent Number: 4,548,642

[45] Date of Patent: Oct. 22, 1985

[54] PROCESS FOR PREPARING ZINC POWDER FOR ALKALINE BATTERIES (V)

[75] Inventor: Wolfgang Glaeser, Goslar, Fed. Rep. of Germany

[73] Assignee: Grillo-Werke AG, Duisburg, Fed. Rep. of Germany

[21] Appl. No.: 593,941

[22] Filed: Mar. 27, 1984

[30] Foreign Application Priority Data

Mar. 31, 1983 [DE] Fed. Rep. of Germany ....... 3311920

[51] Int. Cl.⁴ .............................................. B22F 9/00
[52] U.S. Cl. .................................. 75/0.5 B; 75/0.5 C; 420/523
[58] Field of Search ....................... 420/513, 523, 524; 75/0.5 B, 0.5 C

[56] References Cited

U.S. PATENT DOCUMENTS

| | | | |
|---|---|---|---|
| 2,982,705 | 5/1961 | Sakano et al. | 420/523 |
| 3,527,596 | 9/1970 | Butterfield | 420/524 |
| 4,432,937 | 2/1984 | Kuwayama et al. | 420/523 |

*Primary Examiner*—Wayland Stallard
*Attorney, Agent, or Firm*—Wegner & Bretschneider

[57] ABSTRACT

A zinc powder having a low gas evolution in an alkaline electrolyte for use in an alkaline battery are obtained by alloying the zinc with at least one metal selected from the group consisting of lead, cadmium, thallium and indium and at least one further metal selected from the group consisting of lead, cadmium, thallium, indium gold, silver, tin and gallium. Thereby it is possible to avoid the use of mercury as an alloying element but nevertheless to obtain a zinc powder which meet all of the requirements for use in alkaline batteries.

8 Claims, No Drawings

PROCESS FOR PREPARING ZINC POWDER FOR ALKALINE BATTERIES (V)

FIELD OF THE INVENTION

The present invention relates to a process for preparing zinc powder for use in an alkaline battery, the zinc powder having a low evolution of gas in an alkaline electrolyte due to the alloying of the zinc with other metals.

BACKGROUND OF THE INVENTION

Zinc powder is only suitable for use in alkaline batteries if it exhibits a sufficiently low evolution of hydrogen gas in the electrolyte also without a current output. To this end, zinc powder is generally passivated by means of mercury. This passivation may be attained either by a so-called subsequent amalgamation following the powder preparation or by powdering zinc amalgams according to German Offenlegungsschrift 24 41 356.

However, the use of mercury involves considerable expense for labor and environmental protection. In the course of the preparation and handling of the zinc-mercury powder until charging same into the batteries, measures for environmental protection and labor protection are always necessary, since the mercury evaporates from the zinc powder. The relatively large surface of the zinc powder even causes the saturation vapor pressure of mercury above the zinc powder to be reached very rapidly.

SUMMARY AND DESCRIPTION OF THE INVENTION

It is the object of the present invention to avoid the drawbacks of the zinc powders as conventionally used in alkaline batteries containing a relatively high amount of from 0.1 to 10% by weight of mercury and, nevertheless, to provide a zinc powder which in use in an alkaline battery results in a sufficiently low evolution of gas.

It has been known that alloy additives of lead reduce the gas evolution by zinc powder but not to an extent sufficient for rendering said lead-alloyed zinc powders suitable for use in an alkaline battery. Investigations carried out by the present inventors had further shown that the properties of a zinc powder having been alloyed with mercury under certain circumstances may be somewhat improved by the addition of further alloying elements selected from the group consisting of gold, silver, tin, lead, cadmium, indium, thallium, gallium, and zinc. However in all of these cases it was absolutely necessary that mercury was the most important alloying component in addition to zinc.

Now there has surprisingly been found that zinc powders having a low gas evolution in an alkaline electrolyte for use in an alkaline battery can be prepared by alloying the zinc with lead and at least one metal selected from the group consisting of cadmium, thallium, indium, gold, silver, tin and gallium. Hereby, apparently, an unforeseeable synergistic effect occurs, whereby the gas evolution is reduced to an extent that the zinc powders having been thus obtained may be readily used for alkaline batteries.

The amounts of the two metal components for lead are in the range from 10 ppm to 5% by weight, and preferably between 100 ppm and 0.9% by weight. The amounts of cadmium are between 2 ppm and 5% by weight, and preferably between 20 ppm and 1% by weight. The amounts of thallium are between 10 ppm and 5% by weight, and preferably between 20 ppm and 0.5% by weight. The amounts of indium are between 2 ppm and 5% by weight, and preferably between 100 ppm and 1% by weight. The amounts of gold are from 1 ppm to 0.1% by weight, and preferably from 10 ppm to 0.02% by weight. The amounts of silver are from 1 ppm to 0.1% by weight, and preferably from 10 ppm to 0.05% by weight. The amounts of tin are from 10 ppm to 5% by weight, and preferably from 100 ppm to 1% by weight. The amounts of gallium are from 1 ppm to 0.1% by weight, and preferably from 10 ppm to 0.01% by weight. The total amount of added metals should not exceed 10% by weight, and is preferably not more than 5% by weight.

In carrying out the process according to the invention, zinc is allowed with the aforementioned metals in the conventional manner, and the alloy is atomized in a per se known manner. The molten alloy is preferably atomized with a mixture of gas and water, the amount of water employed being so that it is completely evaporated due to the heat content of the powder particles.

Another method for atomizing the alloy consists of granulating the melt of the alloy, then grinding to make a powder and, if desired removing the coarse grain and fine grain portions by sieving. Preferred particle sizes for zinc powder used in alkaline batteries are between 70 and 600 $\mu$m. Commercially available products mostly have particle size distributions of between 125 $\mu$m and 500 $\mu$m.

The process according to the invention is further illustrated by way of the following examples. The employed alloys were prepared in a per se known manner by addition of the respective alloying element in the metal form to liquid zinc and subsequent homogenization. They were atomized. To the atomizer process gas there was added water in an amount so that it was just able to be completely evaporated. The obtained product was sifted, and the fraction of the sifted, product having a grain size between 125 $\mu$m and 500 $\mu$m was investigated.

The gas evolution was measured in an alkaline electrolyte that had been prepared by dissolving 400 g of KOH and 40 g of ZnO in water and diluting to a total of 1000 ml. The evolution of gas was measured at 50° C. for 100 hours.

Under the above conditions, pure zinc powder will on the average evolve 1 to 2 $\mu$l of gas per gram per hour.

Under the above conditions, pure zinc powder alloyed with 6% of mercury will on the average evolve 0.08 $\mu$l of gas per gram per hour.

Under the above conditions, pure zinc powder alloyed with 0.1% by weight of lead will on the average evolve 0.29 $\mu$l of gas per gram per hour.

EXAMPLE 1

Pure zinc was alloyed with 0.05% by weight of lead and 20 ppm of cadmium and processed with a mixture of gas and water in the above-described manner to give a zinc powder. Measuring the amount of gas evolved on the average resulted in a value of 0.12 $\mu$l/h/g.

EXAMPLE 2

Pure zinc was alloyed with 0.07% by weight of lead and 0.03% by weight of cadmium and processed in the above-described manner to give a zinc powder. The gas evolution on the average amounted to 0.10 μl of gas per hour per gram.

EXAMPLE 3

Pure zinc was alloyed with 0.05% by weight of lead, 20 ppm of cadmium and 10 ppm of thallium and processed in the above-described manner to give a zinc powder. The gas evolution on the average amounted to 0.09 μl of gas per hour per gram.

EXAMPLE 4

Pure zinc was alloyed with 0.05% by weight of lead and 20 ppm of thallium and processed in the above-described manner to give a zinc powder. The gas evolution on the average amounted to 0.13 μl of gas per hour per gram.

EXAMPLE 5

Pure zinc was alloyed with 2.7% by weight of lead, 30 ppm of thallium, 5 ppm of cadmium and 130 ppm of indium and processed in the above-described manner to give a zinc powder. The gas evolution on the average amounted to 0.07 μl of gas per hour per gram.

What is claimed is:

1. A process for preparing a zinc powder having a low gas evolution in an alkaline electrolyte for use in an alkaline battery by alloying the zinc with other metals,
   comprising alloying the zinc with from 10 ppm to 5% by weight lead and cadmium, thallium, and indium;
   wherein the added metals are used in amounts of cadmium of from 2 ppm to 5% by weight, of thallium of from 10 ppm to 5% by weight, and of indium of from 2 ppm to 5% by weight, the total amount of cadmium, thallium, and indium being not more than 10% by weight, based on the weight of the alloy; and
   atomizing the alloy to form a powder, the particle sizes being between 70 and 600 μm.

2. The process of claim 1, wherein the zinc is alloyed with between 100 ppm and 0.9% by weight of lead.

3. The process according to claim 1, wherein the molten alloy is atomized with a mixture of gas and water, the amount of water employed being so that it is completely evaporated due to the heat content of the powder particles.

4. The process of claim 1, wherein the zinc is alloyed with 2.7% by weight of lead, 30 ppm of thallium, 5 ppm of cadmium, and 130 ppm of indium.

5. A process for preparing a zinc powder having a low gas evolution in an alkaline electrolyte for use in an alkaline battery by alloying the zinc with other metals,
   comprising alloying the zinc with from 10 ppm to 5% by weight lead and cadmium, thallium, and indium;
   wherein the added metals are used in amounts of cadmium of from 2 ppm to 5% by weight, of thallium of from 10 ppm to 5% by weight, and of indium of from 2 ppm to 5% by weight, the total amount of cadmium, thallium, and indium being not more than 10% by weight, based on the weight of the alloy;
   granulating a melt of the alloy; and
   grinding the granulated melt to make a powder.

6. The process according to claim 5, wherein the coarse grain and fine grain portions of the powder are removed by sieving.

7. The process of claim 5, wherein the zinc is alloyed with between 100 ppm and 0.9% by weight of lead.

8. The process of claim 5, wherein the zinc is alloyed with 2.7% by weight of lead, 30 ppm of thallium, 5 ppm of cadmium, and 130 ppm of indium.

* * * * *